US009774656B1

(12) United States Patent
Jackson

(10) Patent No.: US 9,774,656 B1
(45) Date of Patent: *Sep. 26, 2017

(54) METHOD FOR MEDIA SHARING BASED ON LOCATION PROXIMITY

(71) Applicant: Google Inc., Mountain View, CA (US)

(72) Inventor: Dean Kenneth Jackson, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,519

(22) Filed: Oct. 6, 2015

Related U.S. Application Data

(63) Continuation of application No. 13/467,032, filed on May 8, 2012, now Pat. No. 9,160,786.

(51) Int. Cl.
H04L 29/08 (2006.01)
G06F 17/30 (2006.01)
H04L 12/18 (2006.01)
H04L 29/06 (2006.01)
G06Q 10/10 (2012.01)

(52) U.S. Cl.
CPC ........ H04L 67/06 (2013.01); G06F 17/30749 (2013.01); G06Q 10/10 (2013.01); H04L 12/1827 (2013.01); H04L 65/403 (2013.01)

(58) Field of Classification Search
USPC ....................................................... 709/204
See application file for complete search history.

(56) References Cited

U.S. PATENT DOCUMENTS

| 6,571,279 | B1* | 5/2003 | Herz | G06F 17/30867 707/999.01 |
| 2002/0007395 | A1* | 1/2002 | Matsuda | G06Q 10/10 709/204 |
| 2003/0225834 | A1 | 12/2003 | Lee et al. | |
| 2005/0071279 | A1 | 3/2005 | Asano | |
| 2006/0129513 | A1 | 6/2006 | Nakatani et al. | |
| 2006/0195512 | A1* | 8/2006 | Rogers | G06F 17/30766 709/203 |
| 2007/0030824 | A1* | 2/2007 | Ribaudo | G01S 5/0018 370/328 |
| 2007/0094272 | A1 | 4/2007 | Yeh | |
| 2008/0239888 | A1 | 10/2008 | Kotani et al. | |
| 2009/0164459 | A1* | 6/2009 | Jennings | H04W 4/02 |
| 2009/0164574 | A1* | 6/2009 | Hoffman | H04W 4/02 709/204 |

(Continued)

Primary Examiner — Razu A Miah
(74) Attorney, Agent, or Firm — Morris & Kamlay LLP

(57) ABSTRACT

Methods, systems, and computer programs are presented for sharing songs stored on a cloud music storage. One method includes identifying a first user and a second user who are connected to their respective music accounts and identifying the configuration data for each of the first and second users. The configuration data identify sharing privileges as respectively defined by the first and second users. The method also includes monitoring the location proximity between the first user and second user and initiating the sharing privileges for certain songs between the first and second users when the monitored location proximity changes to be within a distance threshold. A notification to the first user is provided when the sharing privileges of the second user identify songs that are sharable with the first user.

20 Claims, 6 Drawing Sheets

(56) References Cited

U.S. PATENT DOCUMENTS

| | | |
|---|---|---|
| 2009/0201896 A1* | 8/2009 | Davis .................... H04W 84/18 370/338 |
| 2009/0248792 A1 | 10/2009 | Lee et al. |
| 2009/0248794 A1 | 10/2009 | Helms et al. |
| 2009/0282005 A1 | 11/2009 | Kim et al. |
| 2010/0251384 A1 | 9/2010 | Yen |
| 2010/0332530 A1* | 12/2010 | McKelvie ......... G06F 17/30584 707/770 |
| 2011/0083111 A1 | 4/2011 | Forutanpour et al. |
| 2011/0208830 A1 | 8/2011 | Haruna et al. |
| 2011/0231778 A1* | 9/2011 | Hoag ................ G06F 17/30867 715/745 |
| 2011/0276396 A1* | 11/2011 | Rathod ............. G06F 17/30867 705/14.49 |
| 2011/0282944 A1 | 11/2011 | Henderson et al. |
| 2011/0298701 A1 | 12/2011 | Holzer et al. |
| 2012/0060100 A1 | 3/2012 | Sherwood et al. |
| 2012/0072495 A1* | 3/2012 | Jennings ................ H04W 4/02 709/204 |
| 2012/0179768 A1 | 7/2012 | Herold |
| 2012/0246228 A1* | 9/2012 | Udezue ............... H04L 12/1859 709/204 |
| 2012/0246266 A1* | 9/2012 | Mallet .................... G06Q 50/01 709/217 |
| 2012/0271883 A1* | 10/2012 | Montoya ............... H04W 4/023 709/204 |
| 2012/0290648 A1* | 11/2012 | Sharkey ............ G06F 17/30053 709/204 |
| 2014/0006465 A1 | 1/2014 | Davis et al. |

* cited by examiner

METHOD FOR MEDIA SHARING BASED ON LOCATION PROXIMITY

BACKGROUND

Internet applications have grown tremendously over the years and so has the functionality provided to devices that access those applications. One area that has seen such growth relates to audio file management. An audio file management application enables a user to browse and purchase music selections from the internet or on-line music stores, and download the purchased music to the user's personal device or store the purchased music in a cloud music storage. The audio file management application can further organize the purchased music contents and play the music selected by the music owner.

SUMMARY

Embodiments of the present disclosure provide methods, systems, and computer programs for sharing songs stored on a cloud music storage. It should be appreciated that the present disclosure can be implemented in numerous ways, such as a process, an apparatus, a system, a device or a method on a computer readable medium. Several inventive embodiments of the present disclosure are described below.

In one embodiment, a method includes identifying a first user and a second user who are connected to their respective music accounts and identifying the configuration data for each of the first and second users. The configuration data identify sharing privileges as respectively defined by the first and second users. The method also includes monitoring the location proximity between the first user and second user and initiating the sharing privileges for certain songs between the first and second users when the monitored location proximity changes to be within a distance threshold. A notification to the first user is provided when the sharing privileges of the second user identify songs that are sharable with the first user.

In another embodiment, a system for sharing songs stored on a cloud music storage is disclosed. The disclosed system includes music library access logic, share configuration logic, and share enable logic. The music library access logic may be configured to identify a first user and a second user who are accessing their respective music accounts on the cloud music storage. The share configuration logic may be utilized to identify the configuration data for each of the first and second users. The configuration data of a user identify the sharing privileges defined by the user. In one embodiment, the configuration data may be defined based on the social network information received from a social media server by the music library access logic. The share enable logic is configured to monitor the location proximity between the first and the second users and to initial the sharing privileges for certain songs between the first and second users when the monitored location proximity changes to be within a distance threshold. The share enable logic is further configured to provide a notification to the first user when the sharing privileges of the second user identify songs that are sharable with the first user.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in a simple block diagram format in order to avoid unnecessarily obscuring the present disclosure. Thus, the specific details set forth are merely exemplary. Particular implementations may vary from these exemplary details and still be contemplated to be within the spirit and scope of the present disclosure.

Reference in the description to "one embodiment" or "an embodiment" means that a particular feature, structure, or characteristic described in connection with the embodiment is included in at least one embodiment of the disclosure. The appearances of the phrase "in one embodiment" in various places in the specification do not necessarily all refer to the same embodiment.

Embodiments of a method and a system are described for sharing songs stored on a cloud music storage between two or more users. In one embodiment, the disclosed method may identify a first user and a second user who may be accessing their respective music accounts on the cloud music storage, and identify the configuration data for each of the first and second users. The configuration data defined by a user identify the sharing privileges for songs in the user's music account. The disclosed method may monitor the location proximity between the first and second users and initiate the sharing privileges for certain songs between the first and second users when the monitored location proximity changes to be within a distance threshold. A notification to a user is provided when the sharing privilege of another user identify songs that are sharable with the user. When the monitored location proximity between the first and second users changes to be beyond the distance threshold, the disclosed method may discontinue the sharing privileges. In one embodiment, after the sharing privileges of another user to a user have been initiated, the disclosed method may still enable the sharing privileges of another user to the user for a song that has started playing to allow the song to finish playing, even if the location proximity between the user and another user changes to be beyond the distance threshold.

Figure 1:
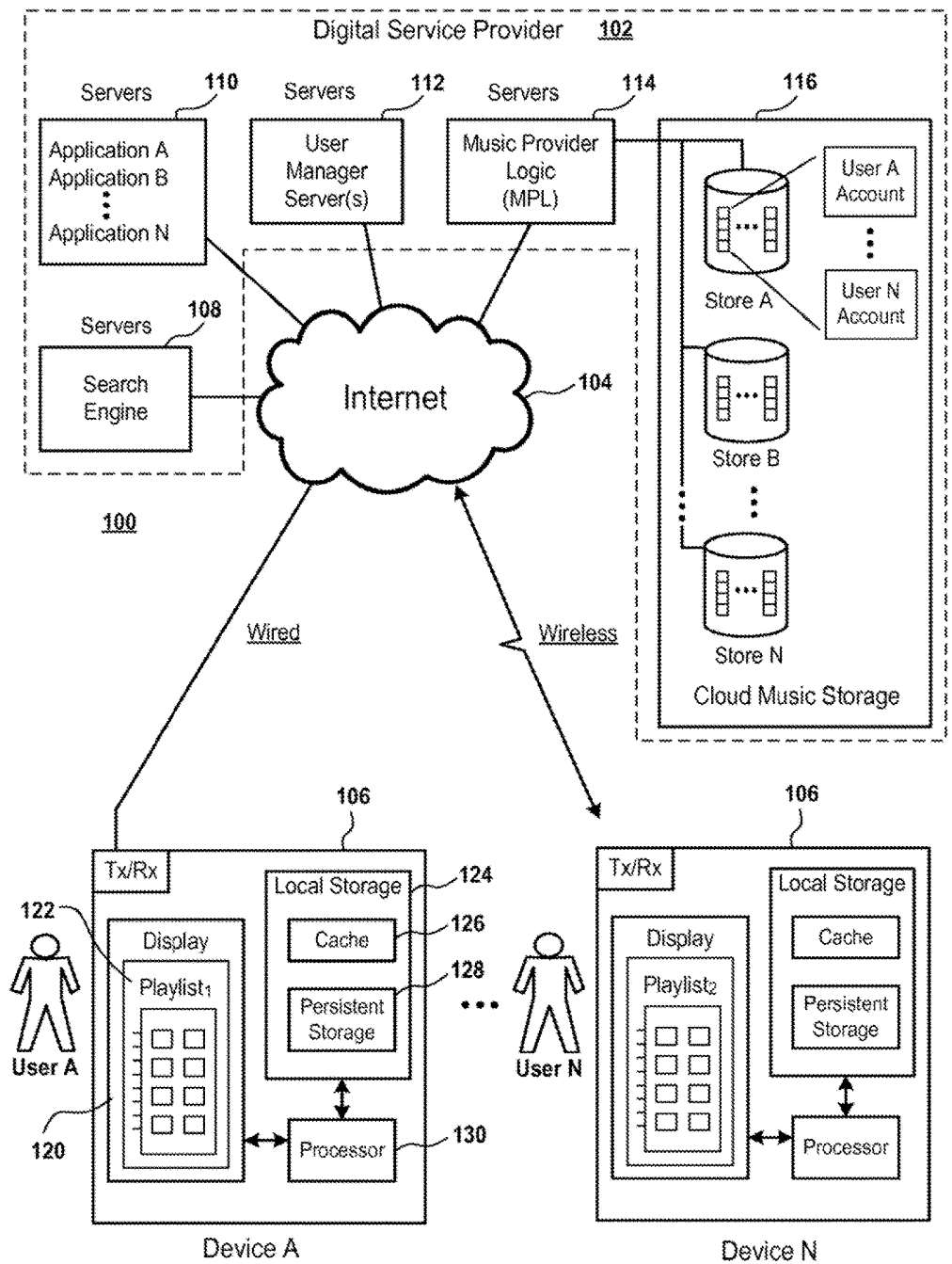
FIG. 1 illustrates a system diagram 100 for enabling access and playing of music files stored in a cloud music storage, in accordance with one embodiment of the present disclosure.

FIG. 1 illustrates a system diagram 100 for enabling access and playing of music files stored in a cloud music storage, in accordance with one embodiment of the present disclosure. The system 100 includes a plurality of servers that are connected to the Internet 104. The plurality of servers and storage are, in one embodiment, part of a digital service provider 102. The digital service provider 102, is a system that can include a plurality of servers that can provide applications, services, digital content, and interconnectivity between systems, applications, users, and social networks. For example, the digital service provider 102 can include a search engine 108, a plurality of servers 110 that provide applications for various business, social, and technology related subject matter, servers that provide user management 112, and servers to provide music related services.

One example digital service provider 102 can be Google Inc., of Mountain View Calif. Other digital service providers can be more focused to provide only specific services, while others provide a variety of services for access, download, viewing, searching, etc. The content can vary greatly, but is commonly presented in digital format and displayed on monitors or screens of devices, computers, smartphones, tablets, etc.

The servers that provide music related services, in one embodiment, are illustrated by the music provider logic 114, that executes over one or more servers that are connected to the Internet 104. The music provider logic 114 is shown connected to a cloud music storage 116. Cloud music storage 116 is shown to include a plurality of storage systems, identified as store A, store B, and store N. The various storage systems that hold music data and music metadata, are provided with fast access to the Internet, for providing music data on demand to users requiring access to their music accounts stored in cloud music storage 116. In one embodiment, users can access the cloud music storage 116 by way of a plurality of devices 106. The plurality of devices can include any type of device having a processor and memory, wired or wireless, portable or not portable. In the example illustrated in FIG. 1, user A is shown to have device 106 (device A). Device 106 is shown to include communication logic for transmitting and receiving data between device 106 and the Internet 104.

The communication logic (Tx/Rx) can include various types of network interface circuitry, radio-communication (e.g. wireless), cell tower communication, or interconnected wiring connected to Internet service providers. Device 106 is also shown to include a display having a screen 120, local storage 124, and a processor 130. Local storage 124 can include cash memory 126, persistent storage 128, and other logic. In this example, device 106 is shown to include graphical icons (e.g., graphical user interfaces GUIs) that represent a play list. The screen 120 can be a touch-screen, or a display typically provided by a flat-panel display, a cathode ray tube (CRT), or other media capable of rendering a display. Still further, device 106 can have its display separate from the device, similar to a desktop computer or a laptop computer. Still further yet, device 106 can be in the form of a smartphone, a tablet computer, or hybrids that provide touch screen capability in a portable form factor.

One example device can include a portable phone device that runs an operating system and is provided with access to various applications (apps) that may be obtained over the Internet, and executed on the local portable device (e.g., smartphone, tablet, laptop, desktop, etc.).

In one embodiment, the user of device 106 can install an application that provides cloud storage of music files, and access to the storage cloud music files from the device 106. Once the user's music files are uploaded to the cloud music storage 116, the user's music files are associated to a library of the user. In one embodiment, a plurality of users can access the same application and can upload their own music files to create their own library, which will be stored in the cloud music storage 116.

Each of such users can then access the cloud music storage 116 through an application on their device 106 to render and play selected music files on their device, when the device 106 has access to the Internet and associated servers of the music provider logic 114 and cloud music storage 116. Accordingly, users can access the music application on their device 106, access all music files stored in cloud music storage 116, arrange music titles in their music library into playlists, add music to the cloud music storage 116, delete music from the cloud music storage 116, and purchase music that is added to the cloud music storage 116. These changes are maintained and managed by the music provider logic 114 and the music provider logic 114 will provide access to the various users to their music files stored in the cloud music storage 116, based on their selections during use of the application.

Figure 2:
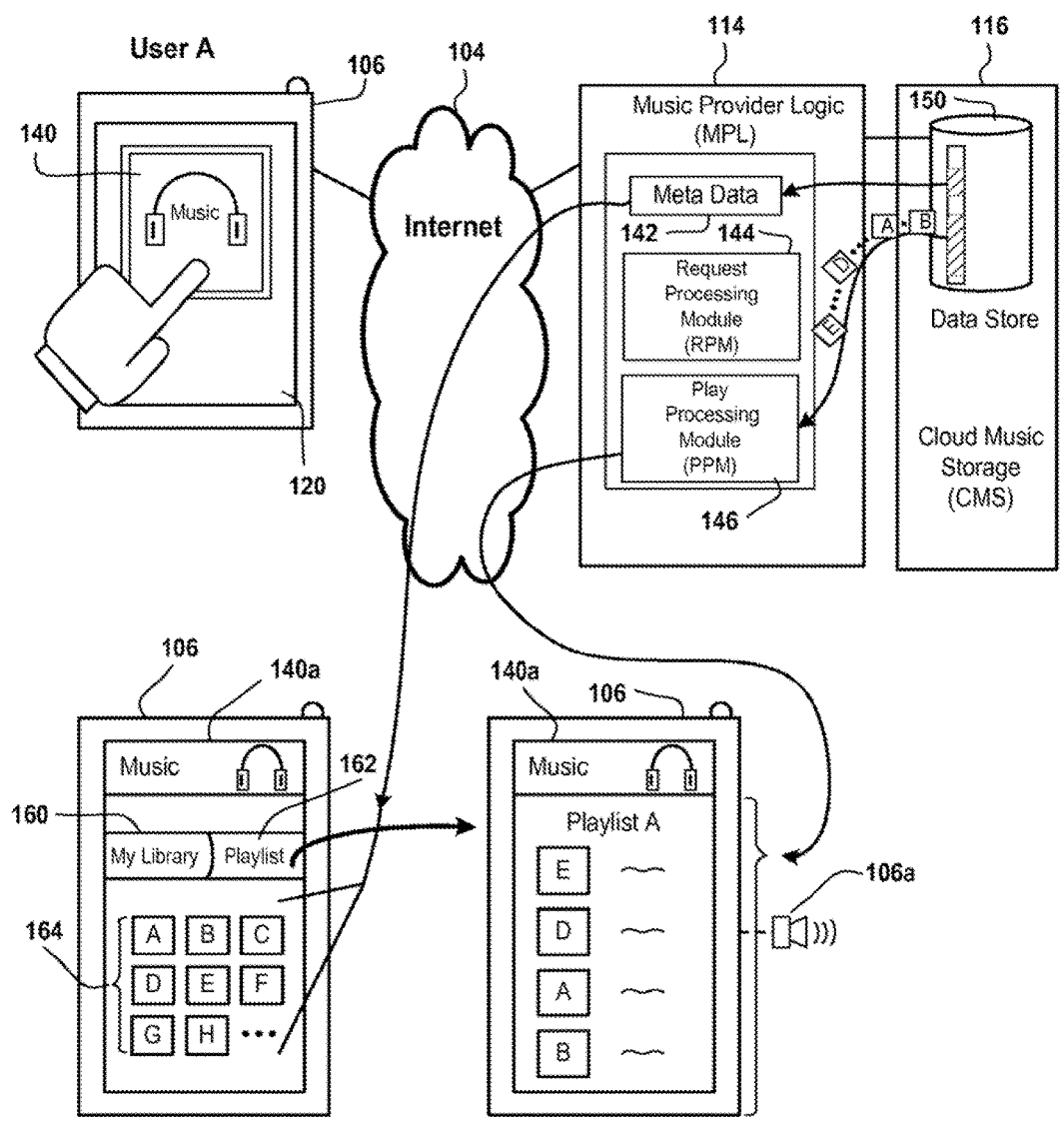
FIG. 2 illustrates how user A utilizes a device 106 (e.g. smartphone) to access his music account stored in the cloud music storage (CMS) 116, in accordance with one embodiment of the present disclosure.

FIG. 2 illustrates how user A utilizes a device 106 (e.g. smartphone) to access his music account stored in the cloud music storage (CMS) 116, in accordance with one embodiment of the present disclosure. As shown, the device 106 will include a screen 120, and associated graphical icons that present a thumbnail of an application 140, associated with a music application. Application 140, as described herein, relates to an application that provides a user with access to his or her music library which has been previously added to the cloud music storage 116. If the user is a new user to the application 140, the new user can download application 140 to device 106 from at least one server 110 of the digital service provider 102.

Once the application 140 has been downloaded and installed on device 106, the icon representing application 140 will be rendered on the display screen of device 106. Initially, the user will be prompted to select music to add to the cloud music storage 116. The music may be added from files currently maintained by the user on his or her device 106, on other devices of the user such as computers, other smartphone and or tablets, or other storage media. Additionally, the user can add music files that may be part of a music library maintained by another application. The other application may maintain a specific format for the music, and the music can be obtained and translated to standardize music files for addition to the cloud music storage 116.

Once the user has managed his library to add, modify, or adjust the music files present in the cloud music storage 116, the user can access application 140 and various options from graphical user interfaces provided on the screen 120 of device 106. In the illustrated example, device 106 will open application 140 through various graphical user interface screens, such as interface 140a. Interface 140a can include various menus, selection icons, configuration icons, displays, advertisements, buttons, listings, etc. In this example, the interface 140a may include an icon that lists the users library 160, the users playlists 162, and music title icons 164. Music title icons can be represented by graphical artwork that represents artwork associated with the various music files present in the users library. The users library is illustrated by title icons 164, shown as A-H.

The title icons 164 are rendered on the screen 120 upon obtaining metadata from the cloud music storage 116 (or accessing the metadata from previous download(s) stored locally on the device), which may be present in data store 150. Music provider logic 114 will include request processing module 144 that manages the requests and communication between various users applications 140 and the cloud music storage 116. The request processing module (RPM) 144 is also in communication with a play processing module (PPM) 146. In order to render the title icons 164 on the screen of the device 106, the music provider logic 114 will utilize the request processing module 144 to obtain metadata 142 from the data store 150.

The metadata 142 will be the metadata associated with the various music files stored in data store 150. The metadata 142 provides information regarding each of the titles stored in the cloud music storage 116, and sufficient information to render the title icons 164 on the screen of device 106, and provides text information, duration information, genre information, and other data that describes aspects or characteristics of the music files. As shown, when the user selects play list 162 on device 106, a play list graphical user interface is shown identifying particular songs that have been arranged by the user.

One of the playlists 162, the playlist A, represents various songs that were selected by the user. The user can have various playlists, and the selection of playlist A is only provided as one example of a playlist that includes music files that are played in the order E→D→A→B. Once the user selects a corresponding play button or clicks on one of the audio files in the playlist, the music files will begin to play, via the speaker 106a, in the order arranged and defined by the user in his or her playlist A.

Figure 3:
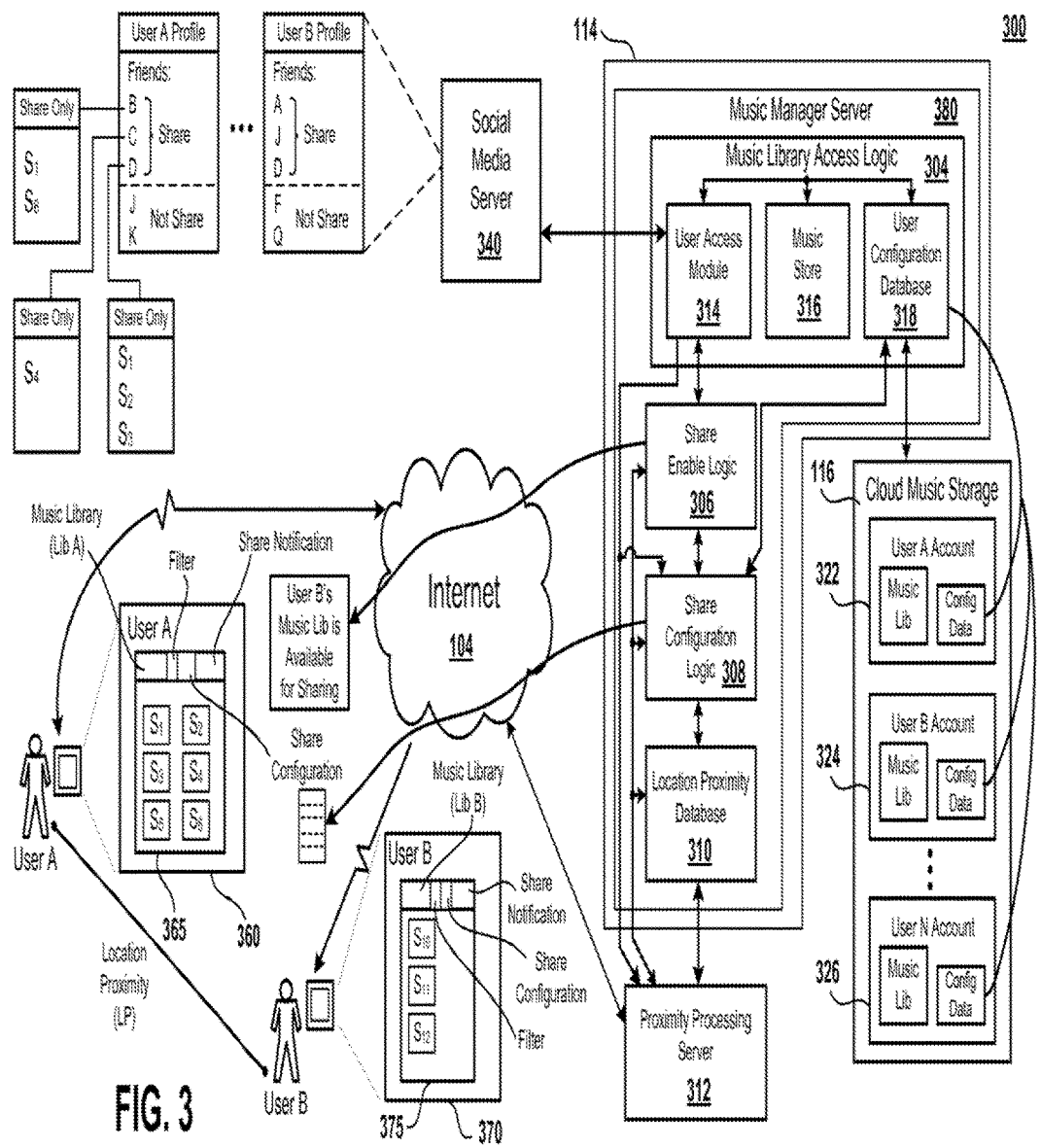
FIG. 3 illustrates a system diagram 300 for initiating and discontinuing sharing privileges for certain songs by monitoring the location proximity changes between two users, in accordance with one embodiment of the present disclosure.

FIG. 3 illustrates a system diagram 300 for initiating and discontinuing sharing privileges for certain songs by monitoring location proximity changes between two users, in accordance with one embodiment of the present disclosure. The system 300 includes a music manager server 380, a proximity processing server 312, and a cloud music storage 116. Users may access the music manager server 380, the proximity processing server 312, and the cloud music storage via the Internet 104. In one embodiment, the music manager server 380 and the proximity processing server 312 are part of the music provider logic 114 as illustrated in FIG. 1. In other embodiments, the music manager server 380 and the proximity processing server 312 can be defined from separate processing systems. For example, the proximity processing server 312 can be service that can be accessed over the internet, and the music manager server 308 can work in conjunction with or in coordination with the music provider logic 114.

In one embodiment, the music manager server 380 includes music library access logic 304, share enable logic 306, share configuration logic 308, and a location proximity database 310. The music library access logic 304 further includes a user access module 314, a music store 316, and a user configuration database 318. The music store 316 enables a user to browse and purchase songs on-line. The newly purchased songs from the music store 316 may be added to song collections in the user's music account stored in the cloud music storage 116. In one embodiment, the cloud music storage 116 can be viewed as a locker for the user's music. A user may also upload songs stored in his personal device storage to his own on-line music account stored in the cloud music storage 116.

The user access module 314 may be used to handle a user's music account login request and to communicate the user login information to the share enable logic 306. In one embodiment, the user access module 314 has access to a social media server 340 that maintains a plurality of social network user profiles. A user may customize his social network user profile by selecting his friends and specifying music sharing privileges for each friend or groups of friends in his social network user profile. Although FIG. 3 illustrates two social network user profiles, user A profile and user B profile, as example, it is to be understood that in practice, many more (or fewer) user profiles may be maintained by the social media server 304.

The cloud music storage 116 maintains a plurality of user music accounts, for example, user A account 322, user B account 324, . . . user N account 326. As shown in FIG. 3, each user music account includes a music library portion and a configuration data portion. The songs stored in the music library portion of a user's music account are either purchased from the music store 316 of the music library access logic 304 or uploaded from the user's previously purchased music stored in the user's device storage. The configuration data portion of a user's music account includes configuration data defined by the user, where the configuration data defines sharing privileges assigned by the user to his friends identified in the configuration data.

For example, a first user may define his sharing privileges to a second user by specifying which songs from the first user's music library the first user would like to share with the second user. In one embodiment, the first user may need to specify the second user's information, such as the second user's name, music account information, etc., for the first user's configuration data. Alternatively, the first user may define his sharing privileges based on the social network information obtained from the social media server 340. For example, if the first user has set up the second user as his social friend in his social network user profile, upon obtaining the second user's information from the social media server 340 by the user access module 314, the user access module 314 may send this information to the share configuration logic 308 that in turn transmits the information to the first user's device so that the first user can define his sharing privileges for the second user.

Once a user has defined his sharing privileges in the form of configuration data, the configuration data may be transmitted to the share configuration logic 308 that in turn saves the configuration data to the user configuration database 318. The user configuration database 318, which maintains a plurality of configuration data records, communicates with the configuration data portions of the user music accounts stored in the cloud music storage 116 to ensure that the configuration data in the configuration data portions of the user music accounts is up to date.

Referring again to FIG. 3, user A and user B may login to their respective music accounts 322 and 324 stored in the cloud music storage 116, via the Internet 104. A user's login request is initiated by a user via his device. For example, user A may initiate the login request via his device 360 by sending his user ID and password for his music account 322. This login request may be received and verified by the user access module 314 of the music library access logic 304. In another embodiment, a user's previous login data may be stored on the device (e.g., similar to a cookie) and can be used initiate faster subsequent logins. In one embodiment, the user access module 314 maintains the music account login information for all users who have created their music accounts. The user access module 314 may also maintain a file storing a list of users who are currently logged into their respective music accounts. In one embodiment, the user access module 314 may communicate with the share enable logic 306 so that the share enable logic 306 has the knowledge of which user is currently logged into his own music account.

Once both user A and user B have logged into their respective music accounts from, e.g., their devices 360 and 370, the user access module 314 will communicate the login information with the share enable logic 306. The share enable logic 306 sends the login information to the proximity processing server 312 so that the proximity processing server 312 can start to measure the location proximity (LP), i.e., the physical or geographic distance, between user A and user B. When the measured location proximity between user A and user B is within a predefined distance threshold, the proximity processing server 312 transmits the user identification information along with the associated distance threshold to the location proximity database 310. The location proximity database 310 may store the received user identification information in a file identified by the associated distance threshold. In one embodiment, when the measured location proximity between user A and user B changes from within the pre-defined distance threshold to beyond the pre-defined distance threshold, the proximity processing server 312 may be configured to remove the stored user identification from the file stored in the location proximity database 310.

The distance threshold may be pre-defined by the digital service provider 102. Alternatively, the distance threshold may be defined by a user. In one embodiment, the proximity processing server may measure the location proximity between two users based on a plurality of pre-defined distance thresholds. In one embodiment, the proximity processing server 312 may utilize the service from Google Latitude, other online services, signals from a cellular tower, GPS, Wi-Fi, or combinations thereof, to track and update any location proximity between two users.

In one embodiment, the share enable logic 306 may monitor the location proximity between user A and user B by checking the location proximity database 310 to obtain the user identification information stored in one or more files identified by various pre-defined distance thresholds. Upon obtaining the user identification information, the share enable logic 306 may initiate the sharing privileges for the users whose identification are listed in a file stored in the location proximity database 310. The share enable logic 306 may continue checking the location proximity database 310 after initiating the sharing privileges. The share enable logic 306 will disable or discontinue the sharing privileges for the users whose identification have been removed from the location proximity database 310. In another embodiment, instead of adding and removing users from a database 310, it is also possible to simply set flags or values that identify when particular users are within or outside of the distance thresholds. These values can then be used to allow or disable sharing privileges to particular songs.

In one embodiment, the share enable logic 306 may provide a notification to user A and a notification to user B, respectively, after initiating the sharing privileges between user A and user B. The notification sent by the share enable logic 306 informs user A that all or portion of user B's music library is available for sharing based on the sharing privileges identified in the user B's configuration data. The notification sent by the share enable logic 306 to user B informs user B that all or portion of user A's music library is available for sharing based on the sharing privileges identified by user A's configuration data. The notification sent from the share enable logic 306 to a user device may be in the form of text messages, graphic images, for example, flashing or highlighted graphic icons, text notes, audio notifications, buzzing, combinations thereof, or other noticeable configurations that are detectable by a user interfacing with his or her device. By providing the notification, the user may determine that he or she no longer wants to share songs with a particular user and can then access the settings to discontinue or adjust his sharing parameters.

In one embodiment, the share configuration logic 308 communicates with the user configuration database 318 and the user access module 314 to obtain the user login information and the previously saved user configuration data. Then, the share configuration logic 308 will send the obtained user configuration data to the users who have logged into their respective music accounts. The share configuration logic 308 may be configured to receive user configuration data from a user and transmit the received user configuration data to the user configuration database 318 to be stored.

Each of the user A device 360 and the user B device 370 is shown to include a display screen 365 or 375, respectively. Each of the display screens 365 and 375 can be a touchscreen, or a display typically provided by a flat-panel display, a cathode ray tube (CRT), or other media capable of rendering a display. Still further, each of the user A device 360 and user B device 370 can have its display separate from the device, similar to a desktop computer or a laptop computer. Still further yet, each of the user A device 360 and the user B device 370 can be in the form of a smartphone, a tablet computer, or hybrids that provide touch screen capability in a portable form factor. One example device can include a portable phone device that runs an operating system and is provided with access to various applications (apps) that may be obtained over the Internet, and executed on the local portable device (e.g., smartphone, tablet, laptop, desktop, etc.).

In one embodiment, each of the user A device 360 and the user B device 370 can install an application that provides cloud storage of music files, and access to the storage cloud music files from a user device. Once the user's music files are uploaded to the cloud music storage 116, the user's music files are associated to a music account of the user. In one embodiment, a plurality of users can access the same application and can upload their own music files to create their own music accounts, which will be stored in the cloud music storage 116.

Referring back to FIG. 3, the display screens 365 and 375 of the user A device 360 and the user B device 370 show an example of a user interface after user A and user B have logged into their respective music accounts. In this example, the user interface includes four example display tabs: a music library tab, a filter tab, a share configuration tab, and a share notification tab. The music library tab shows all songs in a user's music library that are stored in the cloud music storage 116. For example, the music library tab for user A displays that there are six songs (S1, S2, S3, S4, S5, and S6) stored in user A's music library portion of the user A's music account, while user B's music library tab shows user B has three songs (S10, S11, and S12) stored in the music library portion of the user B's music account. The filter tab in each user device may be used to display the criteria utilized by a user to sort or filter the displays in his music library tab. Therefore, the songs displayed in the music library tab of a user interface may be all or portions of the song collections from the user's music library.

The share configuration tab in a user interface of each user device may be used to display the downloaded configuration data. The configuration data may be transmitted from the share cofig logic 308 that obtains the configuration data for a user from the user configuration database 318. A user may update or create his configuration data by entering information related to sharing privileges from the share configuration tab and send the configuration data to the share configuration logic 308 that may in turn save the configuration data to the user configuration database 318. The user configuration data 318 may communicate with the cloud music storage 116 to transmit the newly received user configuration data to the configuration data portion of the user music account.

The share notification tab of a user interface may be used to display any notification sent from the share enable logic 306. In one embodiment, the notification may be text messages showing sharable songs from one or more users. Alternatively, the notification may be graphic images, with each graphic images representing sharable songs from each of a plurality of users, etc.

In one embodiment, the share configuration logic 308 may obtain the a user's social network information, such as the name list of the user's social network friends from the social media server 340 via the user access module 314, and transmit the obtained social network information to the user to be displayed on the user's configuration data tab. In one embodiment, the share configuration logic 308 may constantly or periodically poll the social media server 340. If any social network information has been changed for a logged in user, the share configuration logic 308 will transmit the updated social network information to the user to be displayed in the configuration data tab so that the user may define sharing privileges based on the newly received social network information. By accessing the user's social connections or contacts, users can more easily define who or when to share particular songs.

In another embodiment, a user can define configuration data from a user profile maintained by the social media server 340 and store the user configuration data in his social network user profile maintained by the social media server 340. For example, as shown in FIG. 3, user A has defined that he will share songs S1 and S6 with his friend B, share song S4 with his friend C, and share songs S1, S2, and S3 with his friend D. User A has further defined that he will not share any songs with his friends J and K. By saving the user's configuration information in the user profile in the social media server 340, the user's configuration data may be sharable in all or with selected groups of social friends. The social media server 340 may further transmit the saved user configuration data to the user configuration database 318 in the music manager server 380.

Figure 4A:
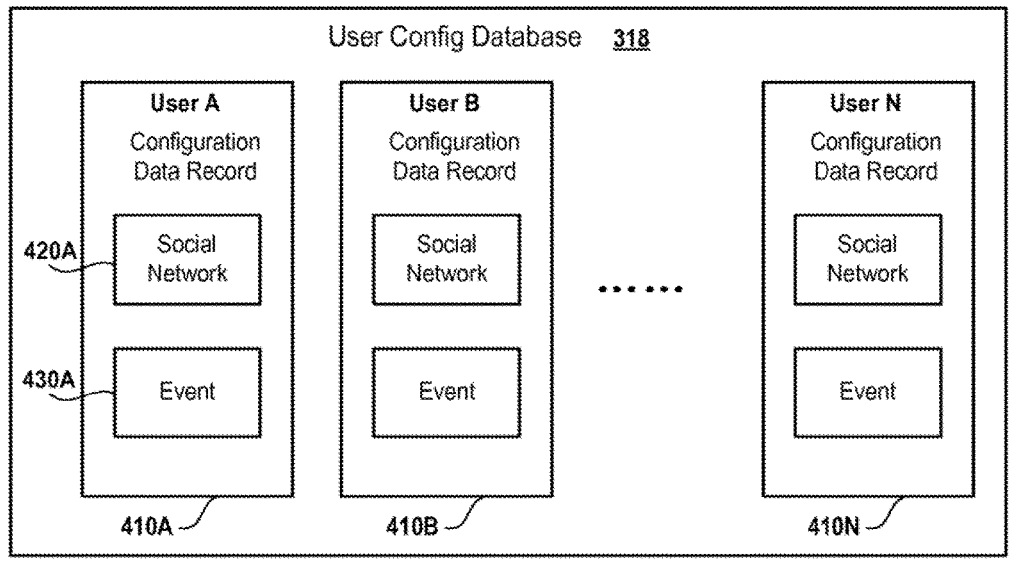
FIG. 4A illustrates a user configuration database 318 utilized for storing configuration data in accordance with one embodiment of the present disclosure.

FIG. 4A illustrates a user configuration database 318 utilized for storing configuration data in accordance with one embodiment of the present disclosure. As shown, the user configuration database 318 maintains a plurality of user configuration data records 410A, 410B, . . . 410N for the users who have defined the configuration data for their respective music accounts. Each user configuration data record includes a social network portion and an event portion. For example, the record for storing user A configuration data includes the social network portion 420A and the event portion 430A. The social network portion in a user's configuration data record is used to store configuration data defined by a user based on his social network information obtained from his user profile maintained by the social media server 340. A user may define sharing privileges for all or portion of his social network friends by specifying which social network friends may share his songs in his music library. In one embodiment, a user may further specify which songs or how many songs he would like to share with which social network friends. The event portion of a user's configuration data record may be utilized to store music sharing privileges for one or more selected events. For example, a user may define which songs can be shared with which social network friends during a social gathering event that will occur during a predetermined time period. Thus, the sharing can be defined globally or can be broken down per event, time frame, etc.

Each user configuration data record stored in the user configuration database 318 may be updated by a user through his configuration data tab displayed in the user's device screen. The configuration data entered by the user can be transmitted to the share configuration logic 308 that in turn transmits the configuration data to the user configuration database 318 so that the configuration data may be stored in the user's configuration data record.

In one embodiment, as shown in FIG. 3, the user configuration database 318 may be configured to communicate with the cloud music storage 116 to update the configuration data stored in the configuration data portion of a user's music account. In another embodiment, the user configuration database 318 may be utilized to obtain the configuration data from the configuration data portion of a user's music account. The obtained configuration data for a user can be transmitted back to the user via the share configuration logic 308.

Figure 4B:
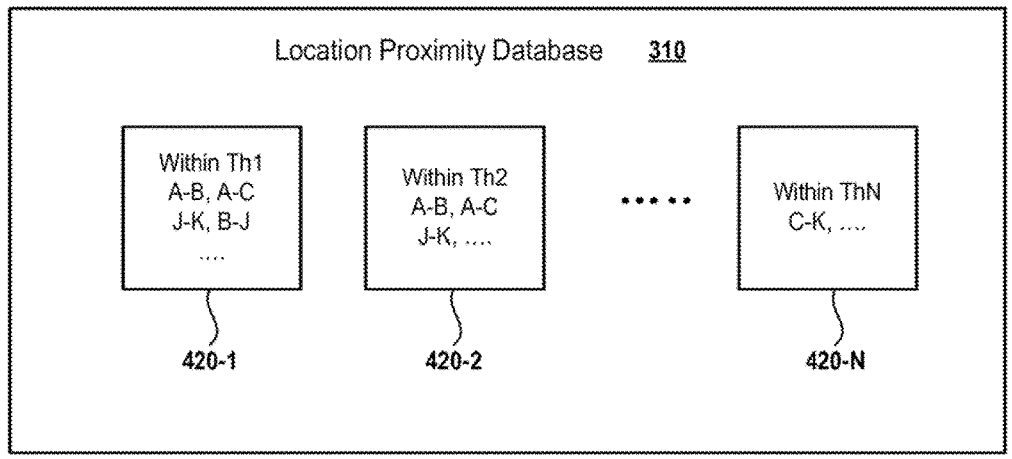
FIG. 4B shows a location proximity database 310 utilized for storing user identification information along with the associated distance thresholds in accordance with one embodiment of the present disclosure.

FIG. 4B shows a location proximity database 310 utilized for storing user identification information along with associated distance thresholds in accordance with one embodiment of the present disclosure. As shown, the location proximity database 310 includes a plurality of files (420_1, 420_2, . . . 420_N), and each file identified by a different pre-defined distance threshold. Each file identified by a distance threshold stored in the location proximity database 310 lists the identification of the users the location proximity of whom is within the defined distance threshold. For example, file 420_1 shows that the identification of users A and B, users A and C, users J and K, and users B and J, the location proximity of each pair of the users is within the distance threshold Th1.

As discussed above, the proximity processing server 312 (as shown in FIG. 3) may update each file stored in the location proximity database 310 by entering user identification for a file or removing user identification from a file based on the location proximity between two users. If the location proximity between two users changes to be within a distance threshold, the identification of the two users will be entered for a file identified by the distance threshold. If the location proximity between the two users changes to be beyond the distance threshold, the proximity processing server 312 may remove the user identification from the file identified by the distance threshold.

Figure 5:
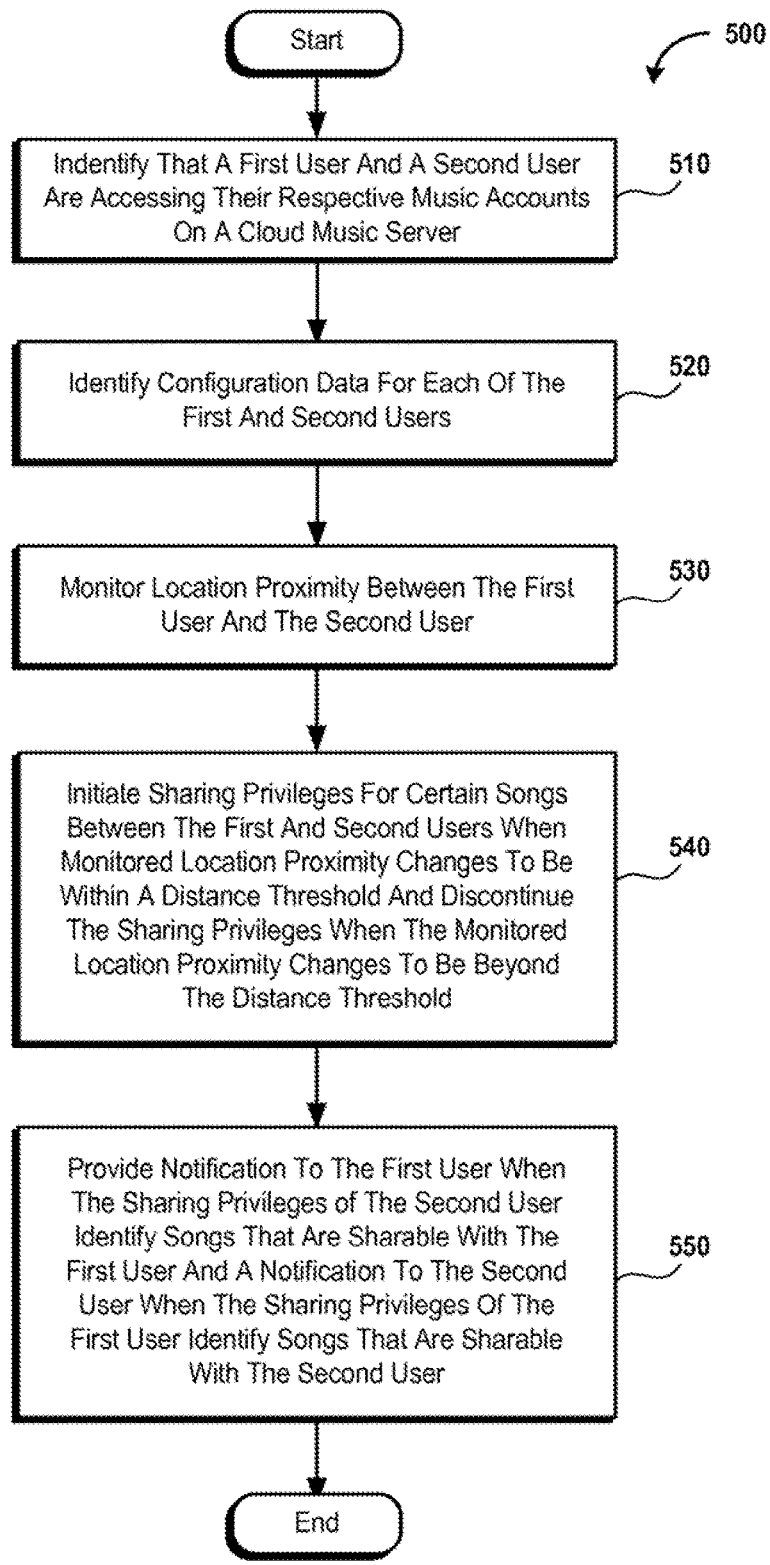
FIG. 5 illustrates a flow diagram of an example method for updating song playlists based on received user rating inputs, in accordance with one embodiment of the present disclosure.

FIG. 5 illustrates a flow diagram of an example method 500 for sharing songs stored on a cloud music storage, in accordance with one embodiment of the present disclosure. In one embodiment, the illustrated method 500 is described in relation to operations performed by the music manager server 380, the proximity processing server 312, and the social media server 340, as shown in FIG. 3. As used herein, the term "music manager server" is used to connote a system that can manage the music sharing functionality between users based on the location proximity between the users. As such, so long as the functionality is provided, the name music manager server is only used for purposes of explaining the functional aspects of the embodiments.

In operation 510, the accesses made by a first user and a second user to their respective music accounts stored on a cloud music server are identified. In one embodiment, a user can access his music account by logging into his music account via the inputs of his music account user ID and password entered from his device. The user access module 314 of the music library access logic 304 of the music manager server 380 may be utilized to receive and process the user's login information. Upon logging in, the user may update or organize his songs in the music library portion of his music account stored in the cloud music storage 116. The user may also purchase one or more songs from the on-line music store 316 of the music library access logic 304 of the music manager server 380 or upload one or more songs that are stored in a local storage in the user's device. The updated music library of the user is stored in his music account in the cloud music storage 116.

In operation 520, the configuration data for each of the first user and the second user are identified. The configuration data of a user identify sharing privileges as defined by the user. In one embodiment, the configuration data is defined based on a user's social network information. For example, a user may specify in the configuration data which his social network friends he would like to share which songs with, or not share a song at all. In another embodiment, the persons that a user wishes to share with can be identified by locating the proximity of other users, if other users have allowed their location to be identified. In another embodiment, persons that a user wishes to share with can be identified from a contact list or by communicating with the user via a text message, an email, a notification, bump pairing, etc. Furthermore, the configuration data may also be defined based on an event that occurs during a specified time period so that the user's identified songs are shareable during the specified time period.

In one embodiment, the share configuration logic 308 is configured to receive the configuration data from a user and transmit the received configuration data to the user configuration database 318 of the music library access logic 304 of the music manager server 380. In another embodiment, the share configuration logic 308 is configured to retrieve recorded configuration data from the user configuration database 318 for a user who has logged into his music account and send the retrieved configuration data to the user so that the configuration data may be displayed in the share configuration tab of the user interface displayed in the screen of the user device.

The user configuration database 318 of the music library access logic 304 of the music manager server 380 may be configured to save the configuration data of each user who has a music account in the cloud music storage. The user configuration database 318 may communicate with the cloud music storage 116 to retrieve from or write to the configuration data portions of users' music accounts stored in the cloud music storage 116. The configuration data of a user may be stored in the user configuration database 318 based on the social network information received from the social media server 340. The user access module 314 is configured to access the social network information stored in the social media server 340. In one embodiment, the configuration data may be saved in the user configuration database 318 based on specified events that occur during specified time periods, in which the user may define which of his songs he would like to share with which of his friends during an identified event. In one embodiment, the configuration data of a user may be stored in the user's social network user profile maintained by the social media server 340.

In operation 530, the location proximity between the first user and the second user is monitored. The location proximity may be measured based on the geographic distance between two users. In one embodiment, the proximity processing server 312 may be utilized to measure the location proximity between the first user and the second user after being informed, for example, by the user access module 314 of the music library access logic 304 of the music manager server 380, that the first user and the second user have logged into their respective music accounts. In one embodiment, the proximity processing server 312 may send the identification of the first user and the second user to the location proximity database 310 of the music manager server 380, when the location proximity between the first and the second users is within a predetermined distance threshold. The location proximity database 310 may store the user identification received from the proximity processing server 312 in a file identified by the associated distance threshold. In one embodiment, the proximity processing server 312 may be configured to remove previously saved user identification from a file stored in the location proximity database 310 when the location proximity between the first user and the second user changes to be beyond the distance threshold. For example, if one user wishes to share music with members of his family when at home, that distance threshold maybe set to an area in and around his home.

The distance can be defined as a linear distance or a radius distance or a volume distance. In either case, users are given the option to share the music with others, so long as those people are within a given distance threshold. As noted above, the distance threshold can be set by the user or can be preset by the owner of the music, the music artist, the music distribution company, etc. The distance threshold setting can also be integrated into the metadata of a file, so that pre-stored sharing distance thresholds automatically get triggered, based on the particular use between users.

In operation 540, the sharing privileges for certain songs between the first user and the second user are initiated when the monitored location proximity changes to be within a distance threshold and the initiated sharing privileges are discontinued when the monitored location proximity changes to be beyond the distance threshold. In one embodiment, the share enable logic 306 of the music manager server 380 may check the files stored in the location proximity database 310 to determine the user identification for the first and second users are stored in one or more files. Once the first and second users have been identified in a file stored in the location proximity database 310, the share enable logic 306 may initiate the music sharing privileges based on configuration data of the first and second users. Subsequently, the share enable logic 306 is further configured to discontinue the sharing privileges between the first and second users if the identification of the users are removed from the file stored in the location proximity database 310.

In operation 550, a notification to the first user is provided when the sharing privileges of the second user identify songs that are sharable with the first user and a notification to the second user is provided when the sharing privileges of the first user identify songs that are sharable with the second user. For example, the share enable logic 306 may be utilized to send the notifications to the respective users. In one embodiment, the notification is a text message showing a list of shareable songs from another user. In another embodiment, the notification is a graphic image representing the shareable songs from another user, text bubbles, text messages, audible sounds, flashing icons, or smile image icon identifiers placed beside particular songs.

In one embodiment, after a user has started playing a song identified to be sharable by another user, the share enable logic 306 will enable listening of the song even if the location proximity between two users changes to be beyond the specified distance threshold.

Figure 6:
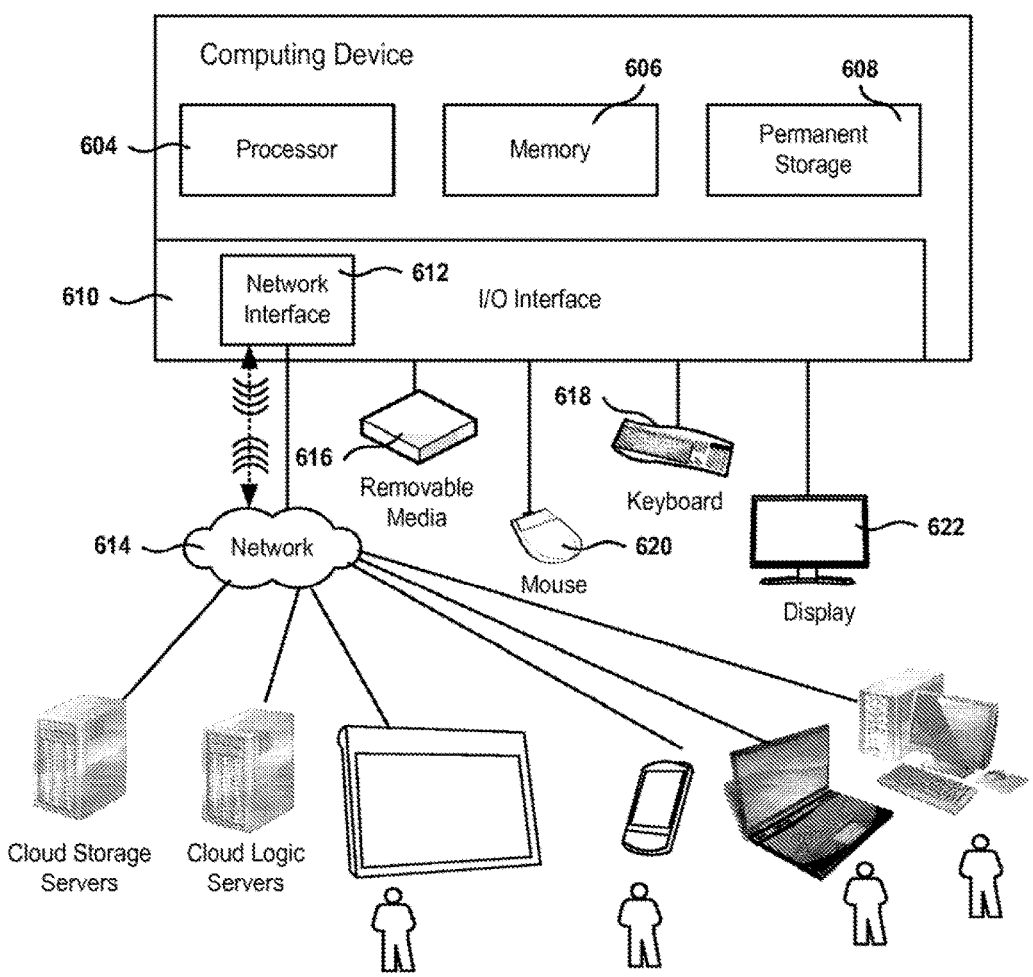
FIG. 6 is a simplified schematic diagram of a computer system for implementing embodiments of the present disclosure.

FIG. 6 is a simplified schematic diagram of a computer system 600 for implementing embodiments of the present disclosure. FIG. 6 depicts an exemplary computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system 600 includes a processor 604, which is coupled through a bus to memory 606, permanent storage 608, and Input/Output (I/O) interface 610.

Permanent storage 608 represents a persistent data storage device such as a hard drive or a USB drive, which may be local or remote. Network interface 612 provides connections via network 614, allowing communications (wired or wireless) with other devices. It should be appreciated that processor 604 may be embodied in a general-purpose processor, a special purpose processor, or a specially programmed logic device. Input/Output (I/O) interface 610 provides communication with different peripherals and is connected with processor 604, memory 606, and permanent storage 608, through the bus. Sample peripherals include display 622, keyboard 618, mouse 620, removable media device 616, etc.

Display 622 is configured to display the user interfaces described herein. Keyboard 618, mouse 620, removable media device 616, and other peripherals are coupled to I/O interface 610 in order to exchange information with processor 604. It should be appreciated that data to and from external devices may be communicated through I/O interface 610. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 608, network attached storage (NAS), read-only memory or random-access memory in memory module 606, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 6 shows various types of devices that can connect to the network, such as the internet. The devices include servers, tablet computers, smartphones, laptops, desktops, etc. The various devices run operating systems and the operating systems can vary from manufacturer to manufacturer.

Some, or all operations of the method presented herein are executed through a processor, such as processor 604 of FIG. 6. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method for sharing songs stored on a cloud music storage, comprising:
    identifying at a computing system that a first user and a second user are connected to their respective music accounts on the cloud music storage;
    identifying at the computing system configuration data for each of the first and second users, the configuration data identifying sharing privileges as respectively defined by the first and second users;
    determining at the computing system location proximity between the first and second users;
    initiating the sharing privileges for certain songs between the first and second users when the location proximity is within a distance threshold;
    providing a notification to the first user when the sharing privileges of the second user identify songs that are sharable with the first user;
    storing data identifying the first and second users in at least one portion of a location proximity database according to the location proximity between the first and second users, where each portion in the database has a different pre-defined distance threshold;
    changing the portion that the data identifying the first and second users is stored in according to a changed location proximity between the first and second users;
    for songs of the first user made sharable to the second user, enabling listening to at least one song for the second user while the first and second users are within the distance threshold; and
    enabling a song to finish playing, if the song has started playing for the second user, even if the first and second users move beyond the distance threshold.

2. The method of claim 1, further comprising:
    providing a notification to the second user when the sharing privileges of the first user identify songs that are sharable with the second user.

3. The method of claim 1, further comprising:
discontinuing the sharing privileges when the monitored location proximity changes to be beyond the distance threshold.

4. The method of claim 1, wherein the location proximity is measured based on geographic distance between the first and second users.

5. The method of claim 4, wherein the location proximity between the first and second users is measured continuously over a period of time.

6. The method of claim 4, wherein the location proximity between the first and second users is measured periodically.

7. The method of claim 1, wherein the notification is a text message identifying sharable songs.

8. The method of claim 1, further comprising:
enabling a monitoring of the location proximity between the first and second users when both of the first and second users move slower than the predetermined speed; and
disabling the monitoring of the location proximity between the first and second users when at least one of the first and second users moves faster than a predetermined speed.

9. The method of claim 1, wherein the notification is an in-application notification identifying sharable songs.

10. The method of claim 1, wherein the identifying that the first user and the second user are accessing their respective music accounts on the cloud music storage comprises receiving login information from each of the first user and the second user for their respective music accounts.

11. A system for sharing songs stored on a cloud music storage, comprising:
a processor communicatively coupled to a memory device, comprising:
music library access logic configured to identify that a first and second users are accessing their respective music accounts on the cloud music storage of the memory device;
share configuration logic configured to identify configuration data for each of the first and second users, the configuration data identifying sharing privileges as respectively defined by the first and second users;
share enable logic configured to:
determine location proximity between the first and second users;
initiate the sharing privileges for certain songs between the first and second users when the location proximity is within a distance threshold;
provide a notification to the first user when the sharing privileges of the second user identify songs that are sharable with the first user;
store data identifying the first and second users in at least one portion of a location proximity database according to the location proximity between the first and second users, where each portion in the database has a different pre-defined distance threshold;
change the portion that the data identifying the first and second users is stored in according to a changed location proximity between the first and second users;
for songs of the first user made sharable to the second user, enable listening to at least one song for the second user while the first and second users are within the distance threshold; and
enable a song to finish playing, if the song has started playing for the second user, even if the first and second users move beyond the distance threshold.

12. The system of claim 11, wherein the share enable logic includes logic for providing a notification to the second user when the sharing privileges of the first user identify songs that are sharable with the second user.

13. The system of claim 11, wherein the share enable logic includes logic for discontinuing the sharing privileges when the monitored location proximity changes to be beyond the pre-defined distance threshold.

14. The system of claim 11, wherein the share enable logic is further configured to remove the identification of the first and second users stored in the portion of the location proximity database identified by the associated pre-defined distance threshold when the location proximity between the first and second users moves to be beyond the pre-defined distance threshold.

15. The system of claim 11, wherein the share enable logic is further configured to monitor the location proximity between the first and second users by checking whether the identification of the first and second users are stored in the portion of the location proximity database identified by the associated pre-defined distance threshold.

16. The system of claim 11, wherein the music library access logic further comprises a user access module and a user configuration database.

17. The system of claim 16, wherein the user access module of the music library access logic is configured to communicate with a social media server to obtain the first and second users' social network information.

18. The system of claim 16, wherein the user configuration database of the music library access logic is configured to store the configuration data of each of the first and second users in a social network configuration record, wherein the stored configuration data of each of the first and second users is defined based on the obtained social network information of each of the first and second users.

19. The system of claim 16, wherein the user configuration database of the music library access logic is further configured to store the configuration data of each of the first and second users in an event configuration record, wherein the event occurs during a specified time period.

20. The system of claim 16, wherein the configuration data of each of the first and second users stored in the user configuration database of the music library access logic is obtained from either inputs of each of the first and second users or configuration data portion of each of the first and second users' music accounts stored in the cloud music storage.

* * * * *